United States Patent
Parello et al.

(10) Patent No.: US 7,084,752 B2
(45) Date of Patent: Aug. 1, 2006

(54) METHOD AND APPARATUS FOR TRIAGE OF NETWORK ALARMS

(75) Inventors: John Parello, Campbell, CA (US); Rituraj Kirti, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 10/844,652

(22) Filed: May 12, 2004

(65) Prior Publication Data

US 2005/0253701 A1    Nov. 17, 2005

(51) Int. Cl.
*G08B 23/00*    (2006.01)

(52) U.S. Cl. ............... 340/517; 340/506; 340/521; 340/286.02

(58) Field of Classification Search ............ 340/506, 340/514, 517, 521, 286.02
See application file for complete search history.

(56) References Cited

U.S. PATENT DOCUMENTS 4,247,846 A * 1/1981 Zedler .................... 340/523
5,400,246 A * 3/1995 Wilson et al. ............. 700/17
5,967,975 A * 10/1999 Ridgeway .................. 600/300

OTHER PUBLICATIONS

"CV 1000 Alarm Monitoring, Inventory, and Real-time Performance Statistics Tool" downloaded Jan. 20, 2005 from http://www.ciena.com/products/cv1000.htm, 1 page.

"HP OpenView Node Manager Advanced Edition 7.5 software" data sheet, Hewlett-Packard Development Company (2003, 2004) 7 pages.

"TeMIP Expert overview & features" downloaded Jan. 20, 2005 from http://www.managementsoftware.hp.com/cgi.bin/pf-new.cgi?IN=hp//products/tmpe/index . . . , Hewlett-Packard Development Company (2005) 2 pages.

* cited by examiner

*Primary Examiner*—Daryl C Pope
(74) *Attorney, Agent, or Firm*—Hickman Palermo Truong & Becker LLP

(57) ABSTRACT

A method and apparatus for triaging alarms transmitting from monitored entities in a network is provided. A relative importance value and a health value are maintained for each of one or more monitored entities. A monitored entity may be any hardware or software component that is capable of issuing an alarm. In response to receiving an alarm at a monitoring device, a triage value is determined based on both the relative importance value and the health value for the monitored entity associated with the received alarm. The triage value reflects any dependencies that the monitored entity that issued the alarm shares with another monitored entities. The triage value also reflects the current operational status of the monitored entity that issued the alarm. The monitoring device may determine an order in which the one or more received alarms should be addressed based on the triage value associated with each alarm.

52 Claims, 6 Drawing Sheets

METHOD AND APPARATUS FOR TRIAGE OF NETWORK ALARMS

FIELD OF THE INVENTION

The present invention relates to the processing of alarms that are issued by network components.

BACKGROUND

Network devices may periodically transmit an alarm to an entity monitoring the status of the network device. An alarm is a notification that an undesirable condition or event has occurred or is occurring at the network device. For example, an alarm may be raised if the network bandwidth available to a device falls below a specified level, or if a device on the computer network experiences a specified condition, e.g., the utilization of a processor on the device is over 90%. Alarms may be initiated using a variety of techniques, e.g. an alarm for a network device may be initiated by the device itself or by another entity.

A variety of components may monitor alarms issued by a network device. For example, a network management station (hereinafter a NMS) is a network element that allows an administrator to monitor the status of network devices operationally connected to the NMS. An administrator may view all the alarms that are received by the NMS from network devices monitored by the NMS.

In another example, a managed service provider (hereinafter a MSP) may also monitor alarms issued by network devices. A MSP is an entity, usually a business, which manages one or more computer networks that are each used by other entities (usually customers of the MSP). MSPs are advantageous when a small business desires to outsource the management of its own computer network to the MSP. In order to effectively manage one or more computer networks for each of its customers, a MSP requires an accurate view of its customer's computer networks. The MSP may monitor alarms raised by network devices of each of the one or more computer networks that the MSP manages to monitor the status of the one or more computer networks.

Entities that monitor alarms raised by network devices may receive a large number of alarms. It is incumbent upon the administrator to sort through all the alarms received at the monitoring entity to determine which of the alarms is most important, i.e., which alarm should be addressed next. To alleviate the burden on the administrator, some entities that monitor alarms may apply a set of rules to the received alarms to give greater weight to those alarms originating from a named network device or associated with a named problem. For example, alarms that issue from a particular email server that must remain operative or any alarm that is associated with an aborted process on a network device may be flagged to bring these alarms to the attention of the administrator.

However, this approach is problematic in that it requires that the administrator determine, a priori, what network devices or problems require the monitoring entity to process alarms associated with those network devices or problems in a special manner to give the alarms greater weight. If a particular network device or problem is not captured in a rule applied by the monitoring entity, then the monitoring entity cannot distinguish how important is an alarm associated with that particular network device or problem. As a result, an administrator implementing this approach must supply a set of detailed rules to the monitoring entity, which may not accurately reflect the current business conditions or operational status of the network. Consequently, some alarms may be given more weight than they should, while other alarms that should be addressed immediately go unnoticed by the administrator.

Accordingly, there is an unaddressed need in the art for determining the order in which alarms issued by network components should be addressed, while avoiding the problems and difficulties associated with the current state of the art. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments described herein are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments described herein. It will be apparent, however, that embodiments may be practiced without these specific details. In other instances, well-known structures and devices are shown in block diagram form in order to avoid unnecessarily obscuring the embodiments described herein.

Functional Overview

Embodiments provide for determining a triage value that expresses how important an alarm is based on the health and relative importance of the entity that issued the alarm. The triage value may be used to order the alarms displayed to an administrator in a manner that describes which alarms should be addressed first and the relative importance of each alarm.

In an embodiment, a relative importance value and a health value are maintained for each of one or more monitored entities. A monitored entity may be any hardware or software component that is capable of issuing an alarm, e.g., a network device or a process executing on a network device. The relative importance value of a monitored entity expresses how importance the monitored entity is relative to other monitored entities in the system. The health value of a monitored entity expresses how robust is the monitored entity. The relative importance value and the health value for each monitored entity in a system may be maintained at a monitoring device, e.g., a NMS.

One or more alarms are received at the monitoring device. Each of the one or more alarms is transmitted by one of the monitored entities in the system. For each received alarm, a triage value is determined based on both the relative importance value and the health value for the monitored entity associated with the received alarm. The triage value for each alarm reflects any dependencies that the monitored entity that issued the alarm shares with another monitored entities. The triage value also reflects the current operational status of the monitored entity that issued the alarm.

The monitoring device may determine an order in which the one or more received alarms should be addressed based on the triage value associated with each alarm. The one or more alarms may be displayed on a graphical user interface (GUI) in the determined order. Using the triage value, an administrator may quickly ascertain an order in which the one or more received alarms should be addressed and the relative value of each alarm's importance.

Other embodiments are described herein.

Architecture Overview

Figure 1:
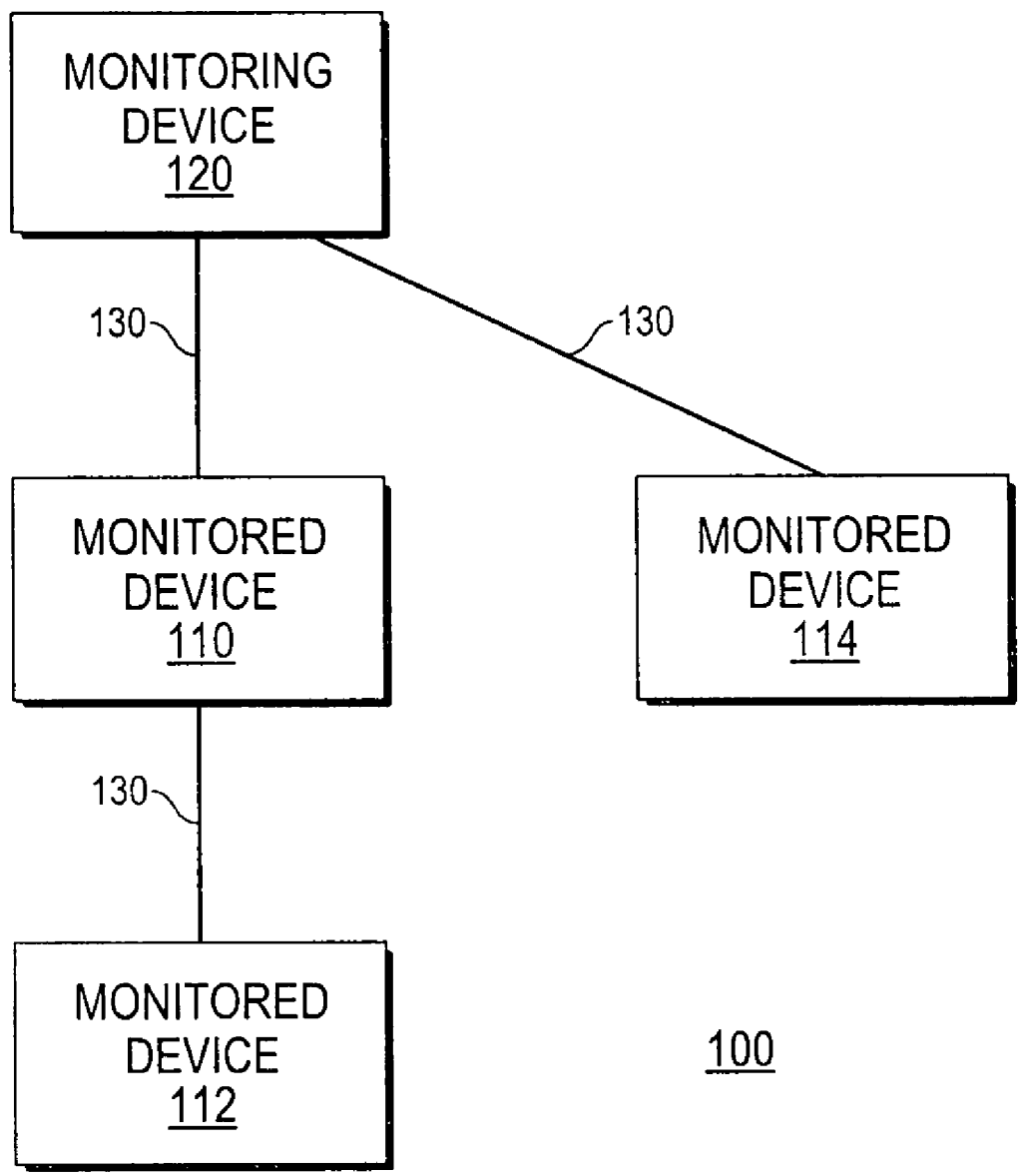
FIG. 1 is block diagram illustrating a system according to an embodiment.

FIG. 1 is block diagram illustrating a system 100 according to an embodiment. The embodiment depicted in FIG. 1 may use a triage value to determine an order of importance for one or more received alarms. System 100 includes a monitored entity 110, 112, and 114, a monitoring device 120, and communications link 130.

A monitored entity, such as monitored entities 110, 112, and 114, each may be implemented by any hardware or software component that is capable of issuing an alarm. Non-limiting, illustrative examples of a monitored entity include a network device (such as a PC, a server, a router, a firewall, a wireless device, and a cell phone) and a process executing on a network device (such as a software application executing on a laptop computer or a process executing on a wireless device). While only three monitored entities are shown in FIG. 1, namely monitored entity 110, 112, and 114, system 100 may comprise any number of monitored entities.

A monitored entity may have a dependent relationship with another monitored entity. If a first monitored entity provides a service to a second monitored entity, then the second monitored entity is said to have a dependent relationship on the first monitored entity. For example, as shown in FIG. 1, monitored entity 110 provides a service to monitored entity 112; thus, monitored entity 112 has a dependent relationship on monitored entity 110. Dependent relationships may also be established between two monitored entities if the operation or non-operation of a first monitored entity affects the operation or non-operation of a second monitored entity, in which case the second monitored entity would have a dependent relationship on the first monitored entity. Some monitored entities may not have a dependent relationship with another monitored entity, e.g., monitored entity 114 does not have a dependent relationship with another monitored entity.

A monitoring device, such as monitoring device 120, may be implemented by any hardware or software component that is capable of receiving alarms from monitored entities in system 100. Non-limiting, illustrative examples of monitoring devices include a network management station (NMS) and any functional component used to receive and view alarms. While only three monitoring device is shown in FIG. 1, namely monitoring device 120, system 100 may comprise any number of monitoring devices.

Communications link 130 may be implemented by any medium or mechanism that provides for the exchange of data between monitored entities or between a monitored entity and a monitoring device. Examples of communications link 130 include, without limitation, a network such as a Local Area Network (LAN), Wide Area Network (WAN), Ethernet or the Internet, or one or more terrestrial, satellite or wireless links.

Use of a Triage Value to Determine Importance of Alarms

Figure 2:
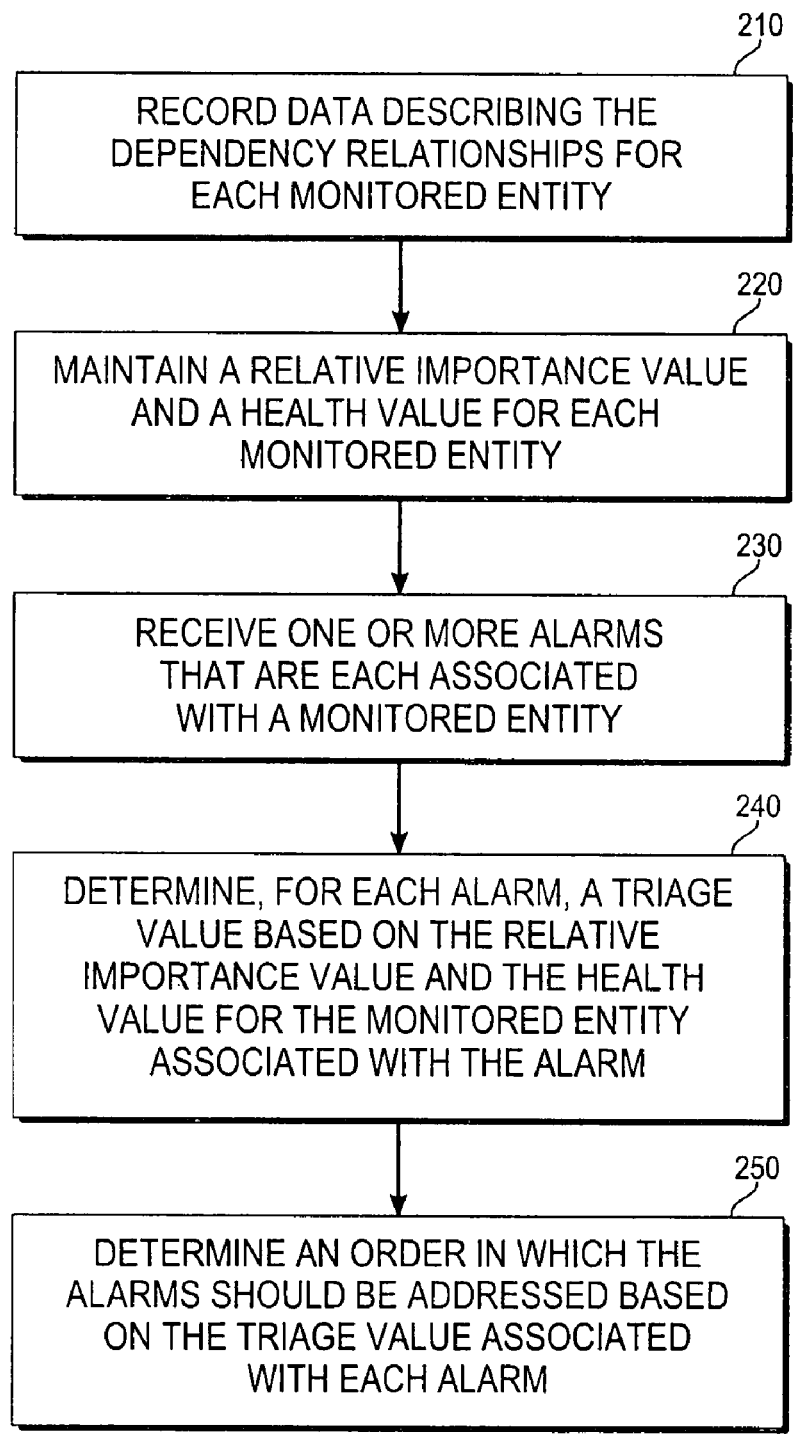
FIG. 2 is a flow chart illustrating the functional steps according to an embodiment.

FIG. 2 is a flow chart illustrating the functional steps according to an embodiment. By performing the functional steps of FIG. 2, a triage value that expresses how important an alarm is based on the health and relative importance of the entity that issued the alarm may be determined. The triage value may be used to order the alarms displayed to an administrator in a manner that describes the order in which alarms should be addressed and the relative importance of each alarm.

In step 210, data that describes the dependent relationships for each of the one or more monitored entities is stored in monitoring device 120. Dependent relationships between monitored entities may be identified by an administrator or by software that provides inspection functionality. A dependent relationship may be established by a monitored entity providing a service to another monitored entity, e.g., if a first monitored entity provides a service to a second monitored entity, then the second monitored entity is said to have a dependent relationship on the first monitored entity. Dependent relationships may also be established between two monitored entities if the operation or non-operation of a first monitored entity affects the operation or non-operation of a second monitored entity, in which case the second monitored entity would have a dependent relationship on the first monitored entity. Step 210 need only be performed once to initialize the system. Whenever a monitored entity is added or removed from the system, then the data that describes the dependent relationships for each of the one or more monitored entities stored in step 210 may need to be updated to reflect the new set of monitored entities in the system. After the performance of step 210, processing proceeds to step 220.

In step 220, a relative importance value and a health value are maintained for each of one or more monitored entities in the system. The relative importance value of a monitored entity expresses how importance the monitored entity is relative to other monitored entities in the system. The health value of a monitored entity expresses how robust is the monitored entity. In an embodiment, the relative importance value and the health value for each monitored entity in a system may be maintained at a monitoring device, e.g., a NMS. In another embodiment, the health value of a monitored entity is stored at the monitored entity, and the health value of the monitored entity is included in each alarm transmitted by the monitored entity. Thus, in such an embodiment, monitoring device 120 can maintain the health value of a particular monitored entity by updating the health value maintained at monitoring device 120 for that particular monitored entity with the new health values of the particular monitored entity contained within in received alarms from the particular monitored entity.

To maintain the relative importance value and the health value for each of one or more monitored entities in the system, both the health value and the relative importance value must first be determined, and thereafter updated as necessary for each of one or more monitored entities in the system. In an embodiment, the health value for each of one or more monitored entities in the system is initially assigned a value that indicates the monitored entity is at full health, i.e., there is nothing wrong with the monitored entity. For example, a value of 100 points or 100% could be used to represent full health. Thereafter, whenever a monitored entity encounters a change in operational condition, the health value of the monitored entity is adjusted to reflect the new operational condition.

If a monitored entity encounters a problem, then the health value of the monitored entity is reduced by a certain percentage or point value. Likewise, if a monitored entity overcomes a problem, then the health value of the monitored entity is increased by a certain percentage or point value. The amount that the health value is adjusted whenever a monitored entity encounters a change in operational condition may be determined by an administrator or may be determined programmatically, e.g., using software that consults a lookup table. In an embodiment, monitoring device 120 maintains and updates the health value of each of the one or more monitored entities in the system whenever monitoring device 120 receives an alarm from the one or more monitored entities.

Figure 3:
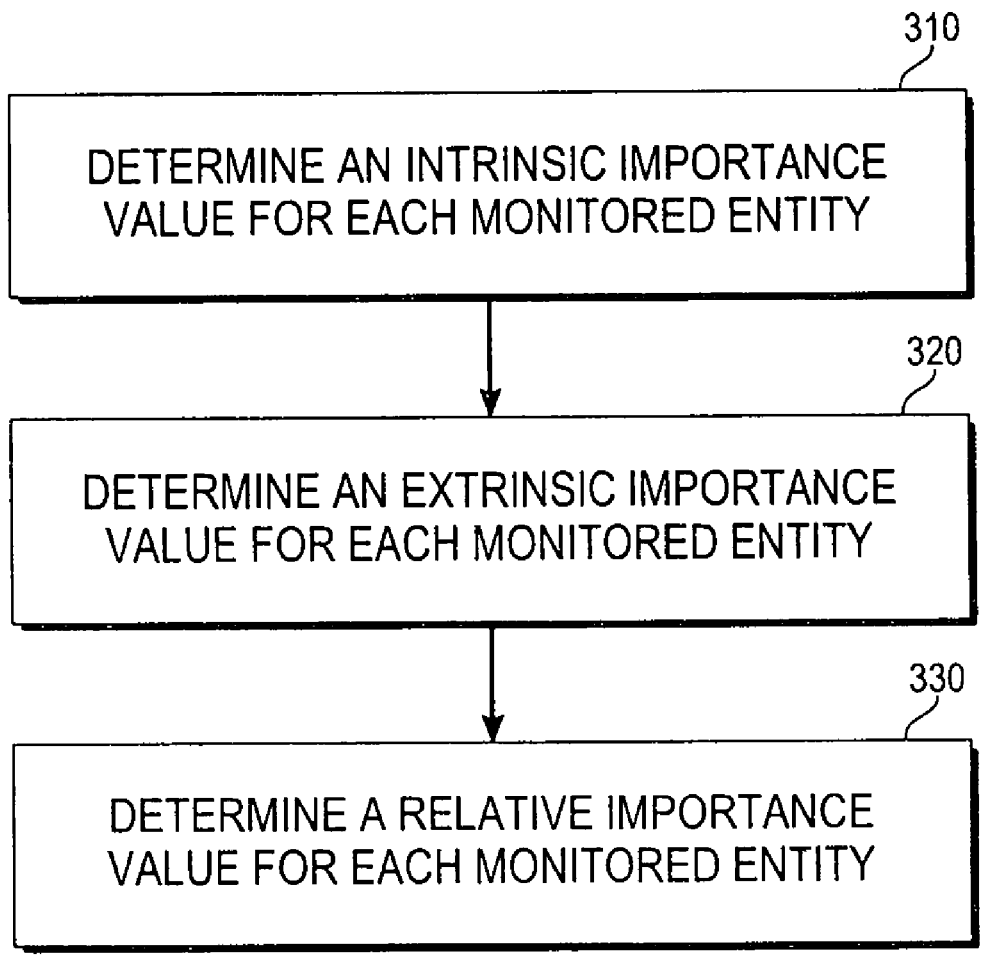
FIG. 3 is a flow chart illustrating the functional steps in obtaining the relative importance value for a particular monitored entity in an embodiment.

The process of maintaining a relative importance value for each of one or more monitored entities according to an embodiment shall be described in further detail with reference to FIG. 3, which is a flow chart illustrating the functional steps in obtaining the relative importance value for a particular monitored entity in an embodiment.

In step 310, an intrinsic importance value for each of one or more monitored entities is determined. An intrinsic importance value of a monitored entity expresses how importance an administrator believes the monitored entity to be to the business. An intrinsic importance value is determined by an administrator. The intrinsic importance value of a monitored entity may be any number, e.g., an integer ranging from 1 to 100, with 100 representing the highest intrinsic importance and 1 representing the lowest intrinsic importance. This range is merely illustrative, as an administrator may use any range of numbers to represent intrinsic importance values.

Figure 4A:
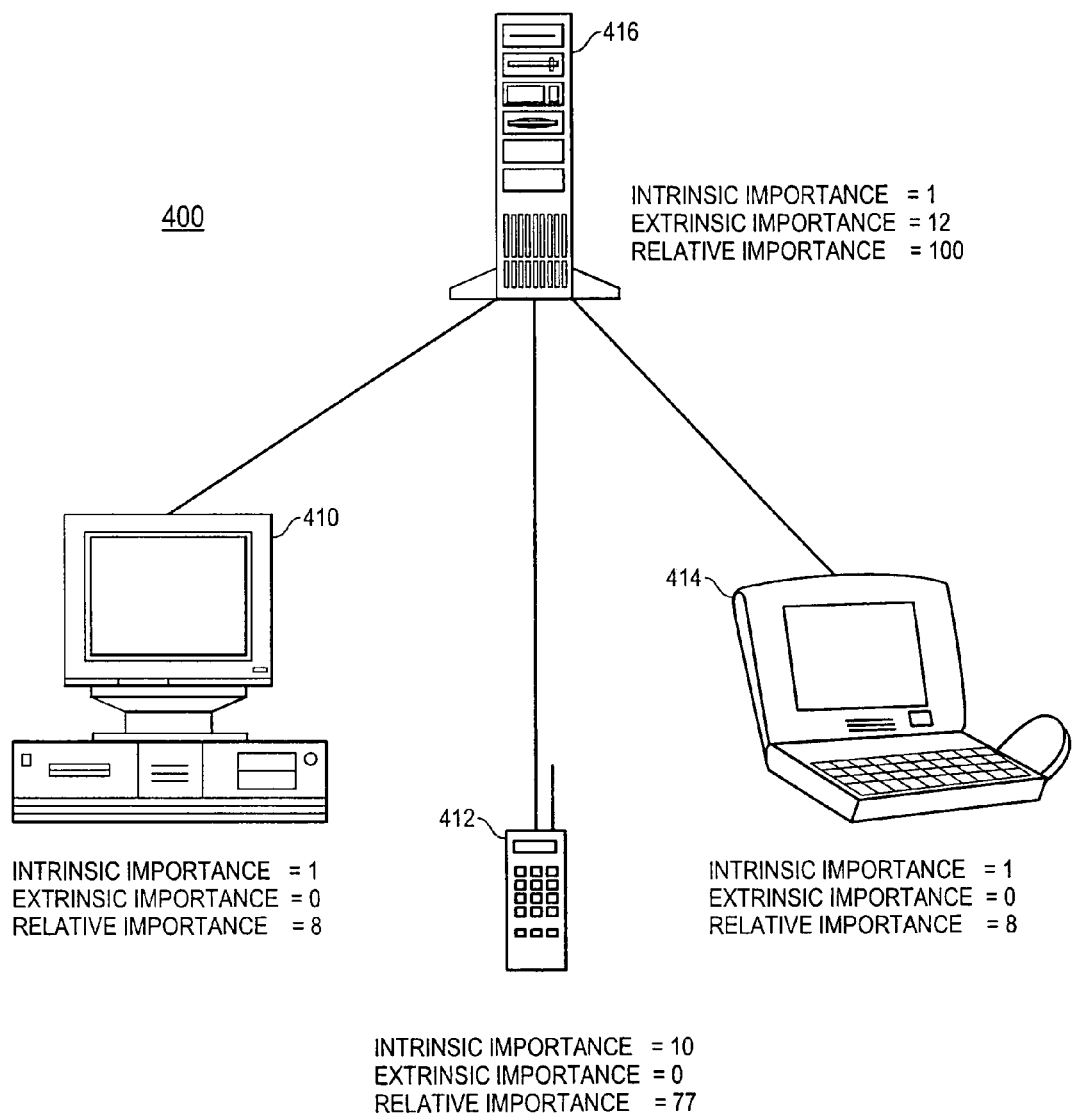
FIG. 4A is a block diagram illustrating an embodiment implemented in a first network.

To illustrate, the determination of the intrinsic importance value for several monitored entities will be discussed with reference to FIG. 4A, which is a block diagram 400 illustrating an embodiment implemented in a first network. FIG. 4A shows monitored entities 410, 412, and 414, each of which has a dependent relationship to monitored entity 416. To determine the intrinsic importance value of each monitored entity in FIG. 4A, an administrator assigns the intrinsic importance value of each monitored entity based on how important the monitored entity is to the operation of a business.

For example, assume that monitored entity 412 represents the cell phone of the CEO of a business; consequently, the administrator places a high priority on this device. Even though the CEO receives a service, e.g., retrieving stock quotes over the Internet, on his cell phone (monitored entity 412) from monitored entity 416, the administrator may assign the monitored entity 412 as the monitored entity with the highest priority. The administrator may assign intrinsic importance values without any regard to any dependent relationships, e.g., an administrator may assign monitored entity 412 a high intrinsic importance value, namely "10," while assigning monitored entity 410, 414, and 416 a low intrinsic importance value, namely "1," even though monitored entity 412 has a dependent relationship with monitored entity 416. After the performance of step 310, processing proceeds to step 320.

In step 320, an extrinsic importance value for each of one or more monitored entities is determined. An extrinsic importance value of a monitored entity expresses how importance the monitored entity, and any monitored entities that have a dependent relationship to that monitored entity, are to the business. In an embodiment, the extrinsic importance value of a monitored entity is the sum of the intrinsic importance values associated with any dependent monitored entities. For example, in FIG. 4A, since monitored entities 410, 412, and 414 do not have any dependent monitored entities, the extrinsic importance value for monitored entities 410, 412, and 414 is zero. The extrinsic importance value for monitored entity 416 is "12" because monitored entities 410 and 414 each have an intrinsic importance value of "1" and monitored entity 412 has an intrinsic importance value of "10," and the sum of "10", "1," and "1" is "12." After the processing of step 320, processing proceeds to step 330.

In step 330, a relative importance value for each of one or more monitored entities is determined. The relative importance value of a monitored entity expresses how importance the monitored entity is relative to other monitored entities in the system.

In an embodiment, the relative importance value may be expressed as a percentage. The relative importance value for a monitored entity may be determined by calculating the sum of the intrinsic importance value and the extrinsic importance value for that monitored entity, divided by the sum of the intrinsic importance value and the extrinsic importance of the monitored entity that yields the greatest value. For example, in FIG. 4A, the sum of the intrinsic importance value and the extrinsic importance value of monitored entity 416 is "13," which is larger than the sum of the intrinsic importance value and the extrinsic importance value of any other monitored entity. Thus, the relative importance of monitored entity 410 is found by dividing 1 by 13, which equals 8 (for simplicity, all relative importance values are rounded), the relative importance of monitored entity 412 is found by dividing 10 by 13, which equals 77, and the relative importance of monitored entity 416 is found by dividing 13 by 13, which equals 100.

The relative importance value provides a mechanism for determining which monitored entities are more important than other monitored entities. For example, if one arranges the monitored entities in FIG. 4A by relative importance value, then monitored entity 416 is most important, followed by monitored entity 412, and thereafter monitored entities 410 and 414. The relative importance value also provides a mechanism for determining how much more or less important a first monitored entity is from another monitored entity. For example, because monitored entity 412 has a relative importance value of 77 and monitored entity 414 has a relative importance value of "8," an administrator may determine that monitored entity 412 is still fairly important to the system, while monitored entity 414 is not that important.

Appendix A describes an algorithm in pseudocode for determining the relative importance value in an embodiment. Note that the above methods and those described in Appendix A for determining the intrinsic importance value, extrinsic importance value, and relative importance value are merely illustrative; other embodiments of the invention may employ different methods for determining the intrinsic importance value, extrinsic importance value, and relative importance value. After the performance of step 220, processing proceeds to step 230.

Returning to FIG. 2, in step 230, one or more alarms that are each associated with one or more monitored entities in the system are received. Monitoring device 120 may receive the alarms of step 230. In an embodiment, each of the one or more alarms that are associated with a monitored entity may be transmitted from the monitored entity to the monitoring device 120 whenever a problem is encountered or an event transpires on the monitored entity. For example, an alarm may be transmitted by a monitored entity anytime an event occurs which changes the health value for the monitored entity. After the performance of step 230, processing proceeds to step 240.

In step 240, for each of the one or more alarms received in step 230, a triage value based on both the relative importance value and the health value for the monitored entity associated with the alarm is determined. A triage value is an expression of how importance an alarm is to the system based on the relative importance and the health value of the monitored entity associated with the alarm. In an embodiment, the triage value for an alarm is based on a product of the relative importance value for the monitored entity associated with the alarm and a health value for the monitored entity associated with the alarm. In other embodiments, the triage value may be based on product of a weighted relative importance value for the monitored entity associated with the alarm and a weighted health value for the monitored entity associated with the alarm. The weighted relative importance value is a relative importance value scaled up or down by a configurable amount, and the weighted health value is a health value scaled up or down by a configurable amount. After the performance of step 240, processing proceeds to step 250.

In step 250, an order in which the one or more alarms should be addressed based on the triage value associated with each alarm is determined. In an embodiment, the order in which the one or more alarms should be addressed may be determined by arranging the one or more alarms in descending order in order of their associated triage value, e.g., the alarm with the highest triage value should be addressed first, the alarm with the next highest triage value should be addressed next, and so on.

Once the order in which the one or more alarms should be addressed based on the triage value associated with each alarm is determined, an administrator may use that information that quickly determine which of the alarms should be addressed first. In addition, the administrator may quickly ascertain how important each alarm is based on the triage value associated with each alarm. An alarm with a higher triage value is more important than an alarm with a lower triage value. By examining the triage value of an alarm, the administrator may ascertain how critical is the alarm.

The one or more alarms may be displayed on a graphical user interface (GUI) with information describing the triage value associated with each alarm. For example, the one or more alarms may be displayed on the GUI in an order arranged by their triage value, which would quickly allow an administrator to ascertain meaningful information about the alarms, e.g., which alarms should be addressed first and how critical each alarm is to the business.

The GUI that displays the one or more alarms may display information about a particular alarm in a different color, e.g. red, if the triage value of the alarm is higher than a specified threshold. Charts, graphs, or other illustrations on the GUI may be provided to allow the administrator to visually assess the triage value, health value, intrinsic importance, extrinsic importance, or relative importance of a monitored entity associated with an alarm. Using this information, the administrator may quickly determine which alarms should be addressed first and how critical each alarm is to the business. Thus, the impact on the business of a problem associated with an alarm may be quickly assessed by the administrator from information displayed on the GUI.

The above methods of calculating an intrinsic importance value, extrinsic importance value, a relative importance value, and a triage value are merely exemplary; other embodiments of the invention may deploy other methods of calculating the above values without departing from the spirit and scope of the teachings herein.

Adding a New Monitored Entity to the System

Monitored entities may be added or removed from embodiments. To illustrate the functional steps involved in altering the number of monitored entities within a system of an embodiment, reference shall be made to FIG. 4B, which is a block diagram illustrating an embodiment. The system 450 of FIG. 4B is similar to the system 400 of FIG. 4A, except that monitored entity 418 has been added to system 450 of FIG. 4B.

Figure 4B:
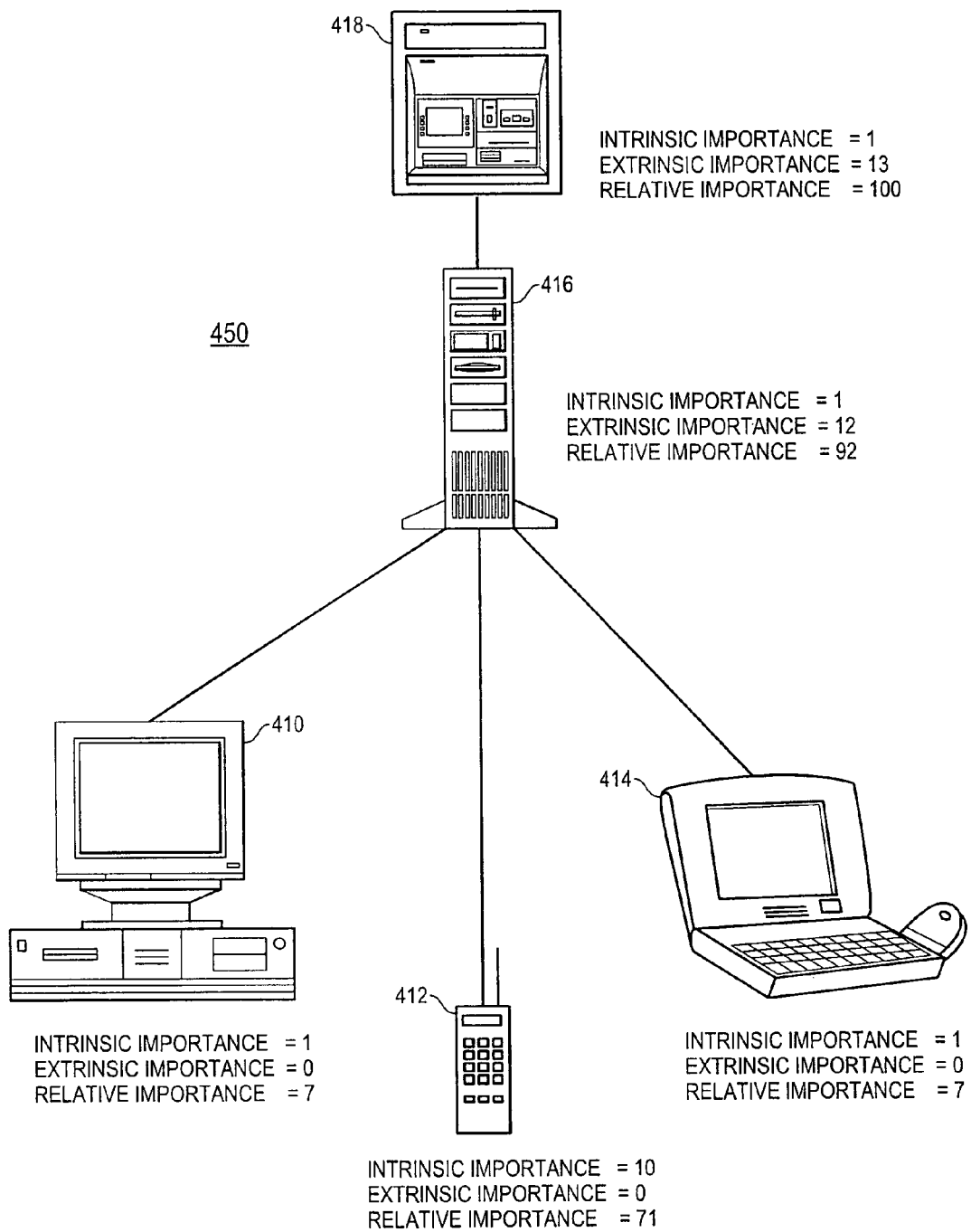
FIG. 4B is a block diagram illustrating an embodiment implemented in a second network.

When new monitored entity 418 is added to system 450, the relative importance value and the health value for monitored entity 418 must be stored at a monitored device (not depicted in FIG. 4B). Thereafter, the relative importance value and the health value for monitored entity 418 are updated whenever a change is detected in either value. In an embodiment, the health value of monitored entity 418 may be maintained at monitored entity 418 and included in any alarm transmitted by monitored entity 418.

In addition to maintaining the relative importance value and the health value for monitored entity 418, the relative importance value associated with each of monitored entities 410, 412, 414, and 416 are updated to reflect the new monitored entity 418. As shown in FIG. 4B, the relative importance of monitored entities 410, 412, 414, and 416 have changed to reflect the addition of monitored entity 418.

Additionally, whenever a monitored entity is added or removed from system 450, then the data that describes the dependent relationships for each of the one or more monitored entities may need to be updated to reflect the new set of monitored entities in the system. As a result, the functionality described with reference to step 210 of FIG. 2 may need to be performed to ensure that the data that describes the dependent relationships for each of the one or more monitored entities reflects the current state of system 450.

Implementing Mechanisms

Figure 5:
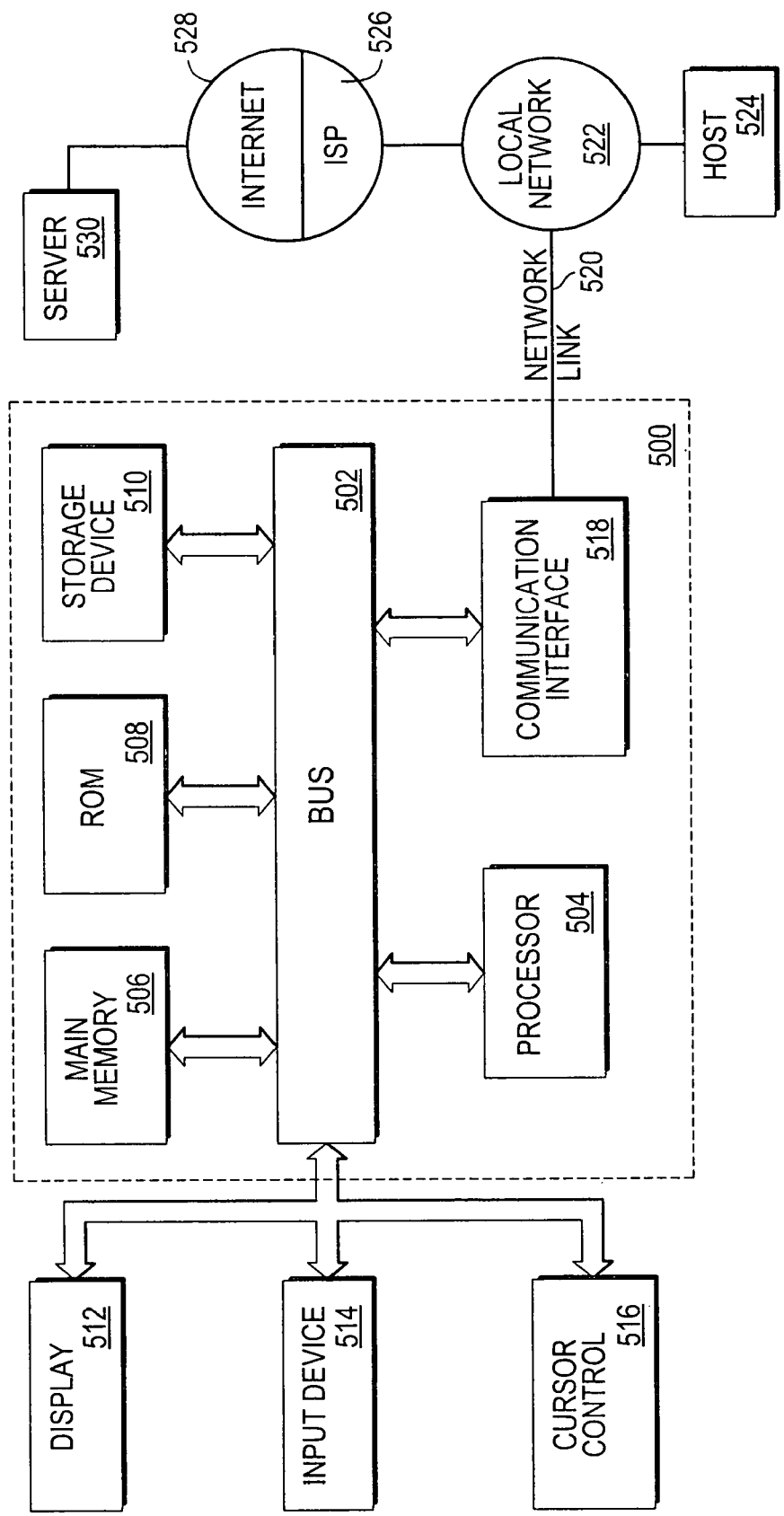
FIG. 5 is a block diagram that illustrates a computer system upon which an embodiment may be implemented.

In an embodiment, a monitoring entity or a monitored device may be implemented on a computer system. FIG. 5 is a block diagram that illustrates a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

```
Let MAX_INTRINSIC_IMPORTANCE be initialized to 0
Let MAX_EXTRINSIC_IMPORTANCE be initialized to 0
COMPUTING EXTRINSIC_IMPORTANCE given a MANAGED_OBJECT
   visited := null set
   Mi.RELATIVE_IMPORTANCE := Compute_Importance (Mi, visited)
   Compute_Extrinsic_Importance (MANAGED_OBJECT Mi, visted)
      if visited.contains (Mi){
         return Mi.EXTRINSIC_IMPORTANCE
      }
      for { Md | each Managed Object in Mi.DEPENDENTS }
         if (Md.DEPENDENTS.isEmpty){
            if (Mi.LOCAL_IMPORTANCE > MAX_LOCAL_IMPORTANCE){
               MAX_LOCAL_IMPORTANCE = Mi.LOCAL_IMPORTANCE
            }
            return Mi.LOCAL_IMPORTANCE
         } else {
            Mi.EXTRINSIC_IMPORTANCE = Compute_Extrinsic_Importance
            (Md) + Mi.LOCAL_IMPORTANCE
            if (Mi.EXTRINSIC_IMPORTANCE >
            MAX_EXTRINSIC_IMPORTANCE){
               MAX_EXTRINSIC_IMPORTANCE =
               Mi.EXTRINSIC_IMPORTANCE
            }
            visited.add (Mi)
            return Mi.EXTRINSIC_IMPORTANCE
         }
      }
RELATIVE_IMPORTANCE given a MANAGED_OBJECT Mx
   RELATIVE_IMPORTANCE := TRUNC (
      ((Mx.INTRINSIC_IMPORTANCE + Mx.EXTRINSIC_IMPORTANCE)/
(MAX_INTRINSIC_IMPORTANCE + MAX.EXTRINSIC_IMPORTANCE) * 100) + .5)
INSERT DEPENDENT Mx for MANAGED_OBJECT Mi
   Mi.DEPENDENTS = Mi.DEPENDENTS + Mx
   Mx.SUPPORTER = Mx.SUPPORTERS + Mi
   Mi.EXTRINSIC_IMPORTANCE = Compute_Extrinsic_Importance (Mi)
DELETE DEPENDENT Mx for MANAGED_OBJECT Mi
   Mi.DEPENDENTS = Mi.DEPEDNENTS - Mx
   Mx.SUPPORTER = Mx.SUPPORTS - Mi
   Mi.EXTRINSIC_IMPORTANCE = Compute_Extrinsic_Importance (Mi)
UPDATE INTRINSIC_importance to x for MANAGED_object Mi
   Mi.INTRINSIC_IMPORTANCE := X
   IF (x>MAX_INTRINSIC_IMPORTANCE){
      MAX_INTRINACI_IMPORTANCE = x
   }
   Compute_Intrinsic_Importance (Mi)
   Compute_Intrisic_Importance (Mi)
   for { Md | each Managed Object in Mi.SUPPORTS } {
      if (Md.SUPPORTERS.isEmpty){
         Compute_Extrinsic_Importance (Mi)
      } else {
         Compute_Intrinsic_Importance (Md)
      }
      Compute_Extrinsic_Importance (Mi)
   }
ALARM TRIAGE Value
   Given an Alarm Ax for Managed Object Mx
   Ax.TRIAGE_VALUE = Mx.HEALTH X Mx.RELATIVE_IMPORTANCE
```

What is claimed is:

1. A method, comprising:
maintaining a relative importance value and a health value for each of one or more monitored entities;
receiving one or more alarms that are each associated with one of the one or more monitored entities;
determining, for each of the one or more alarms, a triage value based on both the relative importance value and the health value for the monitored entity associated with the alarm; and
determining an order in which the one or more alarms should be addressed based on the triage value associated with each alarm of the one or more alarms.

2. The method of claim 1, wherein the triage value for each alarm of the one or more alarms is based on a product of the relative importance value for the monitored entity associated with the alarm and a health value for the monitored entity associated with the alarm.

3. The method of claim 1, wherein at least one of the one or more monitored entities is a network device.

4. The method of claim 1, wherein at least one of the one or more monitored entities is a process executing on a network device.

5. The method of claim 1, wherein the relative importance value for a particular monitored entity in the one or more monitored entities reflects a comparison of an extrinsic importance value for the particular monitored entity to the extrinsic importance value associated with all other monitored entities in the one or more monitored entities.

6. The method of claim 5, wherein each of the one or more monitored entities is associated with an intrinsic importance value, and wherein the extrinsic importance value associated with a specific monitored entity in the one or more monitored entities reflects a sum of all the intrinsic importance values associated with any monitored entity that has a dependency upon the specific monitored entity.

7. The method of claim 1, further comprising:
maintaining an intrinsic importance value for each of one or more monitored entities.

8. The method of claim 1, further comprising:
maintaining an extrinsic importance value for each of one or more monitored entities.

9. The method of claim 1, further comprising:
displaying the one or more alarms on a graphical user interface (GUI) in the order the one or more alarms should be addressed based on the triage value.

10. The method of claim 1, further comprising:
adding a new monitored entity to the one or more monitored entities, wherein adding the new monitored entity comprises:
maintaining the relative importance value and the health value for the new monitored entity;
updating the extrinsic importance value and the relative importance value associated with each of the one or more monitored entities to reflect the new monitored entity; and
updating a set of data that describes the dependent relationships for each of the one or more monitored entities to reflect the new monitored entity.

11. The method of claim 1, wherein a particular alarm of the one or more alarms is associated with a particular monitored entity in the one or more monitored entities, and wherein the particular alarm is transmitted in response to a change in the health value associated with the particular monitored entity.

12. The method of claim 1, further comprising:
storing data that describes the dependent relationships for each of the one or more monitored entities.

13. A method, comprising:
assigning an intrinsic value to each of one or more monitored entities;
dynamically determining a relative importance value for each of one or more monitored entities based on a set of dependent relationships among the one or more monitored entities;
receiving two or more alarms that were each issued by one of the one or more monitored entities; and
dynamically determining an order of importance for two or more alarms based, at least in part, upon the relative importance value associated with the monitored entity in the one or more monitored entities that issued the alarm.

14. A machine-readable medium carrying one or more sequences of instructions, wherein execution of the one or more sequences of instructions by one or more processors causes the one or more processors to perform the steps of:
maintaining a relative importance value and a health value for each of one or more monitored entities;
receiving one or more alarms that are each associated with one of the one or more monitored entities;
determining, for each of the one or more alarms, a triage value based on both the relative importance value and the health value for the monitored entity associated with the alarm; and
determining an order in which the one or more alarms should be addressed based on the triage value associated with each alarm of the one or more alarms.

15. The machine-readable medium of claim 14, wherein the triage value for each alarm of the one or more alarms is based on a product of the relative importance value for the monitored entity associated with the alarm and a health value for the monitored entity associated with the alarm.

16. The machine-readable medium of claim 14, wherein at least one of the one or more monitored entities is a network device.

17. The machine-readable medium of claim 14, wherein at least one of the one or more monitored entities is a process executing on a network device.

18. The machine-readable medium of claim 14, wherein the relative importance value for a particular monitored entity in the one or more monitored entities reflects a comparison of an extrinsic importance value for the particular monitored entity to the extrinsic importance value associated with all other monitored entities in the one or more monitored entities.

19. The machine-readable medium of claim 18, wherein each of the one or more monitored entities is associated with an intrinsic importance value, and wherein the extrinsic importance value associated with a specific monitored entity in the one or more monitored entities reflects a sum of all the intrinsic importance values associated with any monitored entity that has a dependency upon the specific monitored entity.

20. The machine-readable medium of claim 14, wherein execution of the one or more sequences of instructions by the one or more processors further causes the one or more processors to perform the step of:
maintaining an intrinsic importance value for each of one or more monitored entities.

21. The machine-readable medium of claim 14, wherein execution of the one or more sequences of instructions by the one or more processors further causes the one or more processors to perform the step of:
maintaining an extrinsic importance value for each of one or more monitored entities.

22. The machine-readable medium of claim 14, wherein execution of the one or more sequences of instructions by the one or more processors further causes the one or more processors to perform the step of:
displaying the one or more alarms on a graphical user interface (GUI) in the order the one or more alarms should be addressed based on the triage value.

23. The machine-readable medium of claim 14, wherein execution of the one or more sequences of instructions by the one or more processors further causes the one or more processors to perform the step of:
adding a new monitored entity to the one or more monitored entities, wherein adding the new monitored entity comprises the steps of:
maintaining the relative importance value and the health value for the new monitored entity;
updating the extrinsic importance value and the relative importance value associated with each of the one or more monitored entities to reflect the new monitored entity; and
updating a set of data that describes the dependent relationships for each of the one or more monitored entities to reflect the new monitored entity.

24. The machine-readable medium of claim 14, wherein a particular alarm of the one or more alarms is associated with a particular monitored entity in the one or more monitored entities, and wherein the particular alarm is transmitted in response to a change in the health value associated with the particular monitored entity.

25. The machine-readable medium of claim 14, wherein execution of the one or more sequences of instructions by the one or more processors further causes the one or more processors to perform the step of:

storing data that describes the dependent relationships for each of the one or more monitored entities.

26. A machine-readable medium carrying one or more sequences of instructions, wherein execution of the one or more sequences of instructions by the one or more processors causes the one or more processors to perform the steps of:

assigning an intrinsic value to each of one or more monitored entities;

dynamically determining a relative importance value for each of one or more monitored entities based on a set of dependent relationships among the one or more monitored entities;

receiving two or more alarms that were each issued by one of the one or more monitored entities; and dynamically determining an order of importance for two or more alarms based, at least in part, upon the relative importance value associated with the monitored entity in the one or more monitored entities that issued the alarm.

27. An apparatus comprising a memory storing instructions which, when executed by one or more processors, cause the one or more processors to perform the steps of:

maintaining a relative importance value and a health value for each of one or more monitored entities;

receiving one or more alarms that are each associated with one of the one or more monitored entities;

determining, for each of the one or more alarms, a triage value based on both the relative importance value and the health value for the monitored entity associated with the alarm; and determining an order in which the one or more alarms should be addressed based on the triage value associated with each alarm of the one or more alarms.

28. The apparatus of claim 27, wherein the triage value for each alarm of the one or more alarms is based on a product of the relative importance value for the monitored entity associated with the alarm and a health value for the monitored entity associated with the alarm.

29. The apparatus of claim 27, wherein at least one of the one or more monitored entities is a network device.

30. The apparatus of claim 27, wherein at least one of the one or more monitored entities is a process executing on a network device.

31. The apparatus of claim 27, wherein the relative importance value for a particular monitored entity in the one or more monitored entities reflects a comparison of an extrinsic importance value for the particular monitored entity to the extrinsic importance value associated with all other monitored entities in the one or more monitored entities.

32. The apparatus of claim 31, wherein each of the one or more monitored entities is associated with an intrinsic importance value, and wherein the extrinsic importance value associated with a specific monitored entity in the one or more monitored entities reflects a sum of all the intrinsic importance values associated with any monitored entity that has a dependency upon the specific monitored entity.

33. The apparatus of claim 27, wherein the memory further comprises one or more additional instructions which, when executed by the one or more processors, cause the one or more processors to perform the step of:

maintaining an intrinsic importance value for each of one or more monitored entities.

34. The apparatus of claim 27, wherein the memory further comprises one or more additional instructions which, when executed by the one or more processors, cause the one or more processors to perform the step of:

maintaining an extrinsic importance value for each of one or more monitored entities.

35. The apparatus of claim 27, wherein the memory further comprises one or more additional instructions which, when executed by the one or more processors, cause the one or more processors to perform the step of:

displaying the one or more alarms on a graphical user interface (GUI) in the order the one or more alarms should be addressed based on the triage value.

36. The apparatus of claim 27, wherein the memory further comprises one or more additional instructions which, when executed by the one or more processors, cause the one or more processors to perform the step of:

adding a new monitored entity to the one or more monitored entities, wherein adding the new monitored entity comprises the steps of:

maintaining the relative importance value and the health value for the new monitored entity;

updating the extrinsic importance value and the relative importance value associated with each of the one or more monitored entities to reflect the new monitored entity; and updating a set of data that describes the dependent relationships for each of the one or more monitored entities to reflect the new monitored entity.

37. The apparatus of claim 27, wherein a particular alarm of the one or more alarms is associated with a particular monitored entity in the one or more monitored entities, and wherein the particular alarm is transmitted in response to a change in the health value associated with the particular monitored entity.

38. The apparatus of claim 27, wherein the memory further comprises one or more additional instructions which, when executed by the one or more processors, cause the one or more processors to perform the step of:

storing data that describes the dependent relationships for each of the one or more monitored entities.

39. An apparatus comprising a memory storing instructions which, when executed by one or more processors, cause the one or more processors to perform the steps of:

assigning an intrinsic value to each of one or more monitored entities;

dynamically determining a relative importance value for each of one or more monitored entities based on a set of dependent relationships among the one or more monitored entities;

receiving two or more alarms that were each issued by one of the one or more monitored entities; and dynamically determining an order of importance for two or more alarms based, at least in part, upon the relative importance value associated with the monitored entity in the one or more monitored entities that issued the alarm.

40. An apparatus, comprising:

means for maintaining a relative importance value and a health value for each of one or more monitored entities;

means for receiving one or more alarms that are each associated with one of the one or more monitored entities;

means for determining, for each of the one or more alarms, a triage value based on both the relative importance value and the health value for the monitored entity associated with the alarm; and means for determining an order in which the one or more alarms should be addressed based on the triage value associated with each alarm of the one or more alarms.

41. The apparatus of claim 40, wherein the triage value for each alarm of the one or more alarms is based on a product of the relative importance value for the monitored entity associated with the alarm and a health value for the monitored entity associated with the alarm.

42. The apparatus of claim 40, wherein at least one of the one or more monitored entities is a network device.

43. The apparatus of claim 40, wherein at least one of the one or more monitored entities is a process executing on a network device.

44. The apparatus of claim 40, wherein the relative importance value for a particular monitored entity in the one or more monitored entities reflects a comparison of an extrinsic importance value for the particular monitored entity to the extrinsic importance value associated with all other monitored entities in the one or more monitored entities.

45. The apparatus of claim 44, wherein each of the one or more monitored entities is associated with an intrinsic importance value, and wherein the extrinsic importance value associated with a specific monitored entity in the one or more monitored entities reflects a sum of all the intrinsic importance values associated with any monitored entity that has a dependency upon the specific monitored entity.

46. The apparatus of claim 40, further comprising:
means for maintaining an intrinsic importance value for each of one or more monitored entities.

47. The apparatus of claim 40, further comprising:
means for maintaining an extrinsic importance value for each of one or more monitored entities.

48. The apparatus of claim 40, further comprising:
means for displaying the one or more alarms on a graphical user interface (GUI) in the order the one or more alarms should be addressed based on the triage value.

49. The apparatus of claim 40, further comprising:
means for adding a new monitored entity to the one or more monitored entities,
wherein the means for adding the new monitored entity comprises:
means for maintaining the relative importance value and the health value for the new monitored entity;
means for updating the extrinsic importance value and the relative importance value associated with each of the one or more monitored entities to reflect the new monitored entity; and
means for updating a set of data that describes the dependent relationships for each of the one or more monitored entities to reflect the new monitored entity.

50. The apparatus of claim 40, wherein a particular alarm of the one or more alarms is associated with a particular monitored entity in the one or more monitored entities, and wherein the particular alarm is transmitted in response to a change in the health value associated with the particular monitored entity.

51. The apparatus of claim 40, further comprising:
means for storing data that describes the dependent relationships for each of the one or more monitored entities.

52. An apparatus, comprising:
means for assigning an intrinsic value to each of one or more monitored entities;
means for dynamically determining a relative importance value for each of one or more monitored entities based on a set of dependent relationships among the one or more monitored entities;
means for receiving two or more alarms that were each issued by one of the one or more monitored entities; and
means for dynamically determining an order of importance for two or more alarms based, at least in part, upon the relative importance value associated with the monitored entity in the one or more monitored entities that issued the alarm.

* * * * *